United States Patent [19]

Taniguchi et al.

[11] Patent Number: 4,996,605
[45] Date of Patent: Feb. 26, 1991

[54] METHOD AND APPARATUS FOR IMAGE SCANNING INPUT FOR AN IMAGE SCANNING RECORDING APPARATUS

[75] Inventors: Yoshihiro Taniguchi; Hideaki Hashimoto, both of Kyoto, Japan

[73] Assignee: Dainippon Screen Mfg. Co., Ltd., Japan

[21] Appl. No.: 497,834

[22] Filed: Mar. 22, 1990

Related U.S. Application Data

[63] Continuation of Ser. No. 225,048, Jul. 27, 1988, abandoned.

[30] Foreign Application Priority Data

Jul. 30, 1987 [JP] Japan ................ 62-190973

[51] Int. Cl.⁵ ............................................. H04N 1/04
[52] U.S. Cl. .................................... 358/474; 358/493; 358/497; 358/496; 358/489
[58] Field of Search ............... 358/296, 401, 406, 443, 358/446, 493, 75, 80, 405, 447, 452, 453, 462, 464, 486, 487, 488, 489, 490, 496; 355/32, 72, 75

[56] References Cited

U.S. PATENT DOCUMENTS

| | | | |
|---|---|---|---|
| 3,529,078 | 9/1970 | Murata | 358/75 |
| 4,013,829 | 3/1977 | Bear et al. | 358/299 |
| 4,605,970 | 8/1986 | Hawkins | 358/289 |
| 4,647,981 | 3/1987 | Froelich | 358/406 |
| 4,812,916 | 3/1989 | Iwamoto | 358/289 |

FOREIGN PATENT DOCUMENTS

| | | | |
|---|---|---|---|
| 61681 | 10/1982 | European Pat. Off. . | |
| 0106113 | 8/1979 | Japan | 358/453 |
| 0185569 | 11/1982 | Japan | 358/452 |
| 0058430 | 4/1984 | Japan | 358/452 |
| 0176042 | 9/1985 | Japan | 358/452 |
| 0032771 | 2/1987 | Japan . | |
| 2067043 | 7/1981 | United Kingdom . | |
| 2144293 | 2/1985 | United Kingdom . | |

Primary Examiner—Edward L. Coles, Sr.
Assistant Examiner—Jerome Giant, II
Attorney, Agent, or Firm—Ostrolenk, Faber, Gerb & Soffen

[57] ABSTRACT

An image input apparatus for an image scanning reading apparatus comprises a cylindrical holder for holding a plurality of originals and reference portions for calibration serving as references in reading original, a scanning head for scanning the original holder, and a memory for storing positions of the reference portions for calibration. The position of the reference portion for calibration is stored prior to the reading of the original, and when the scanning is started, the scanning head is moved to the stored position, the reference data for calibration is read by the scanning head at that position, and the corresponding original is read based on the data.

15 Claims, 4 Drawing Sheets

METHOD AND APPARATUS FOR IMAGE SCANNING INPUT FOR AN IMAGE SCANNING RECORDING APPARATUS

This is a continuation application of Ser. No. 07/255,048 filed Jul. 27, 1988 now abandoned.

BACKGROUND OF THE INVENTION

1. Field of the Invention

The present invention relates to a method of and an apparatus for reading a reference value of a reading signal in an image scanning reading apparatus such as a color scanner for reproduction, and more specifically to a method of and an apparatus for reading a reference value to read a plurality of originals.

2. Description of the Prior Art

FIG. 1 is a schematic diagram of a color scanner of a conventional image reading apparatus. Referring to FIG. 1, a conventional color scanner comprises a transparent rotary drum 1 for holding a transparent original 2 to be read, an illuminating system for illuminating the original 2 from the inner side of the rotary drum 1, and a scanning head 40 for receiving light from the illuminated original 2 to convert the light into electric signals.

An illuminating portion 37 comprises a halogen lamp 38 for illuminating the transparent original 2 and a condenser lens 39 for condensing light from the lamp 38. The scanning head 40 comprises a pickup lens 31 for receiving light transmitted from the image 2, a color separation system 41 for separating the light received by the pickup lens 31 with respect to color, and photosensitive elements 6 for receiving the separated light and for converting the same into electrical current. The color separation system 41 comprises a half mirror 32, dichroic mirrors 33 and 34 for separating light, a perfect reflection mirror 35 and a filter 36. The dichroic mirror 33 detects red, the dichroic mirror 34 detects blue and the perfect reflection mirror 35 detects green.

In the above example, the original 2 is transparent. If the original 2 is not transparent, a reflective illuminating system is employed.

The operation of the color scanner will be described in the following. The original 2 is held around the rotary drum 1. A portion of the original 2 is selected to be a reference portion. The reference portion is a highlight portion of the original. Thus, the reference portion of a transparent original is a transparent portion of the original. The reference portion of a reflection original is a white portion of the original. Each of the outputs from the photosensitive elements 6 should be the same when the light received by the photosensitive elements 6 is from the reference portion. However, in the above described optical system, each of the dichroic mirrors 33 and 34, the color filter 36 and the photosensitive elements 6 (which include photomultiplier tubes and the like) have independent spectral characteristics.

Therefore, in order to have the same output signal from each photosensitive element to when light is received from the reference portion, white balance calibration (hereinafter referred to as calibration) is carried out to set the sensitivity of each photosensitive portion before reading.

When reading a transparent original, a transparent portion near the original is selected as the reference portion. When reading a reflection original, a white portion near the original is selected as the reference portion. This prevents flaws or unevenness of colorless transparent film which attaches the original onto the rotary drum, or the rotary drum itself, from having an undesired influence on light transmission.

Recently, various operations of the above-described apparatus have been automated so that a plurality of originals can be read successively. When a plurality of originals are set on the drum for color separation, exact output signals cannot be provided if there is only one reference portion. The reason for this is that the sensitivity of each optical system at different positions fluctuates due to the above described problems of unevenness and the like. Therefore, a separate reference portion should be set for each original to effect proper calibration. However, if white balance calibration is carried out by stopping the drum for each original, as in the prior art, the operational efficiency of the apparatus becomes extremely low.

Apertures provided at the photosensitive elements are automatically exchanged or switched to provide a proper pixel dimension for a desired magnification light intensity at the respective photosensitive elements changes when an aperture is exchanged. Thus, calibration should be carried out each time an aperture is exchanged. However, if the drum must be stopped for each calibration, then the operational efficiency of the apparatus again is low.

Each photosensitive elements (which converts a separated color component into respective electric signals) has sensitivity characteristics as well as frequency characteristics. As is well known, the characteristics are associated with responsiveness to change of signals. Therefore, normally, the signal level picked up from the reference portion when the rotary drum is stopped differs slightly from the signal level picked up when the drum is rotating. Therefore, if calibration is carried out with the drum stopped, the resulting difference has to be compensated for.

SUMMARY OF THE INVENTION

Therefore, one object of the present invention is to provide an image reading apparatus which can be automated.

Another object of the present invention is to provide an image reading apparatus which has an improved operational efficiency.

A further object of the present invention is to provide an image reading apparatus which is capable of providing exact color separation signals.

The above described objects of the present invention can be attained by an image scanning input apparatus comprising: an original holder for holding a plurality of originals and reference portions corresponding to respective originals to serve as references for reading the originals; a scanning head for scanning the original holder to optically read the originals and the reference portions a scanning head position detecting scale for detecting the position of the scanning head; a memory responsive to an output of the scanning head for storing the positions of the reference portions, and a scanning head calibrating portion for calibrating said scanning head based on reading signals from the reference portions.

Since the image scanning input apparatus comprises the above described components, information for the reference portions and the like are inputted to the memory prior to scanning images, and the scanning head reads the image based on the data. Therefore, the scanning head need not be stopped to read images as has been the case in the prior art. Consequently, an image scanning input device can be provided which can be automated and whose operational efficiency can be improved.

According to a preferred embodiment of the present invention, a method of operating an image scanning reading apparatus comprises the steps of: storing information corresponding to the positions of the reference portions for originals and then, when a coincidence between the position of the scanning head and the stored position of a reference portion is detected, detecting a light intensity signal from the reference portion by a photosensitive portion and holding the same as an electric signal calibrating the photosensitive portion based on the stored electric signal reading a corresponding original by the calibrated photosensitive portion; and repeating the above described steps to read a plurality of originals.

Since the method comprises the above described steps, the light intensity signals from the reference portions can be detected during scanning. Therefore, the reference signals are detected in the actual reading state. This enables more practical calibration. Consequently, precise color separation can be carried out.

These objects and other objects, features, aspects and advantages of the present invention will become more apparent from the following detailed description of the preferred embodiments when taken in conjunction with the accompanying drawings.

DESCRIPTION OF THE PREFERRED EMBODIMENTS

Figure 1:
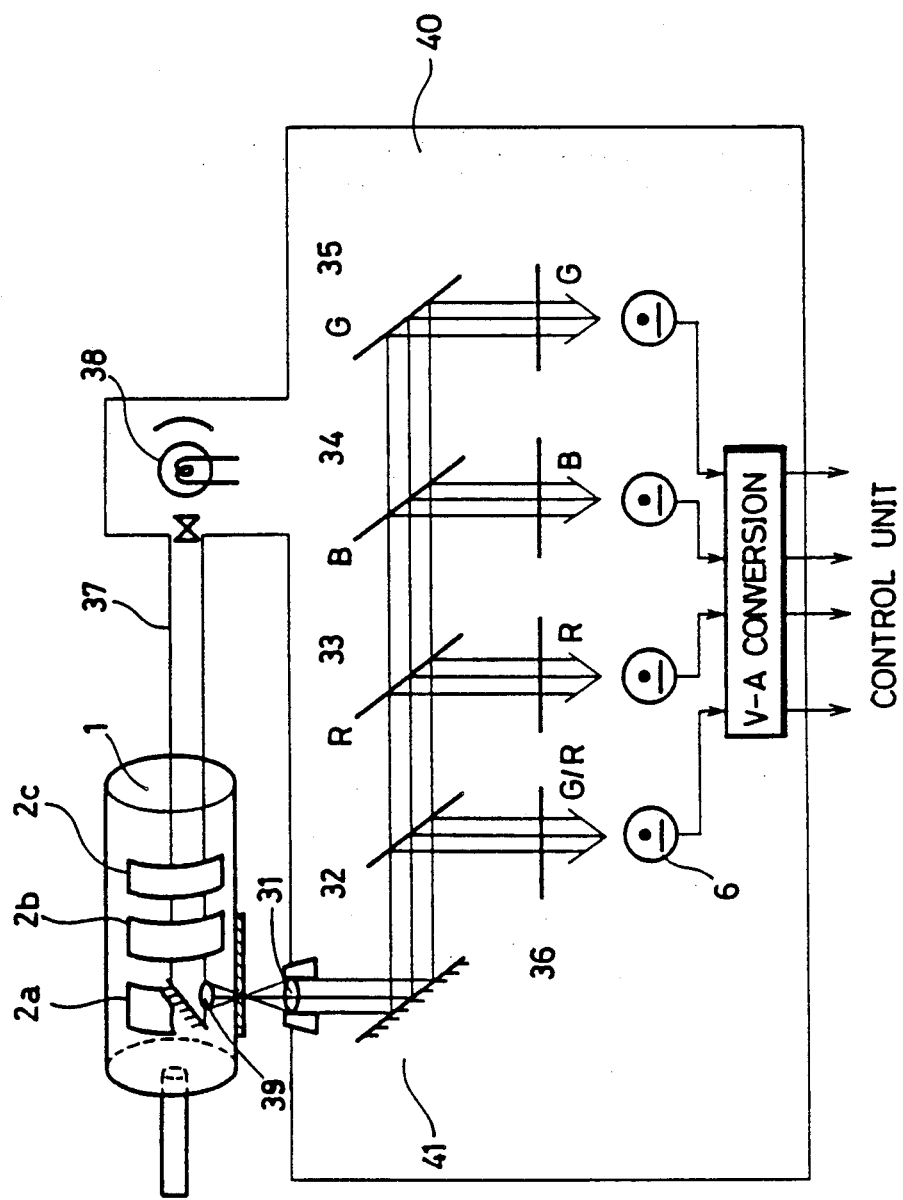
FIG. 1 is a schematic diagram showing a conventional image reading apparatus.
Figure 2:
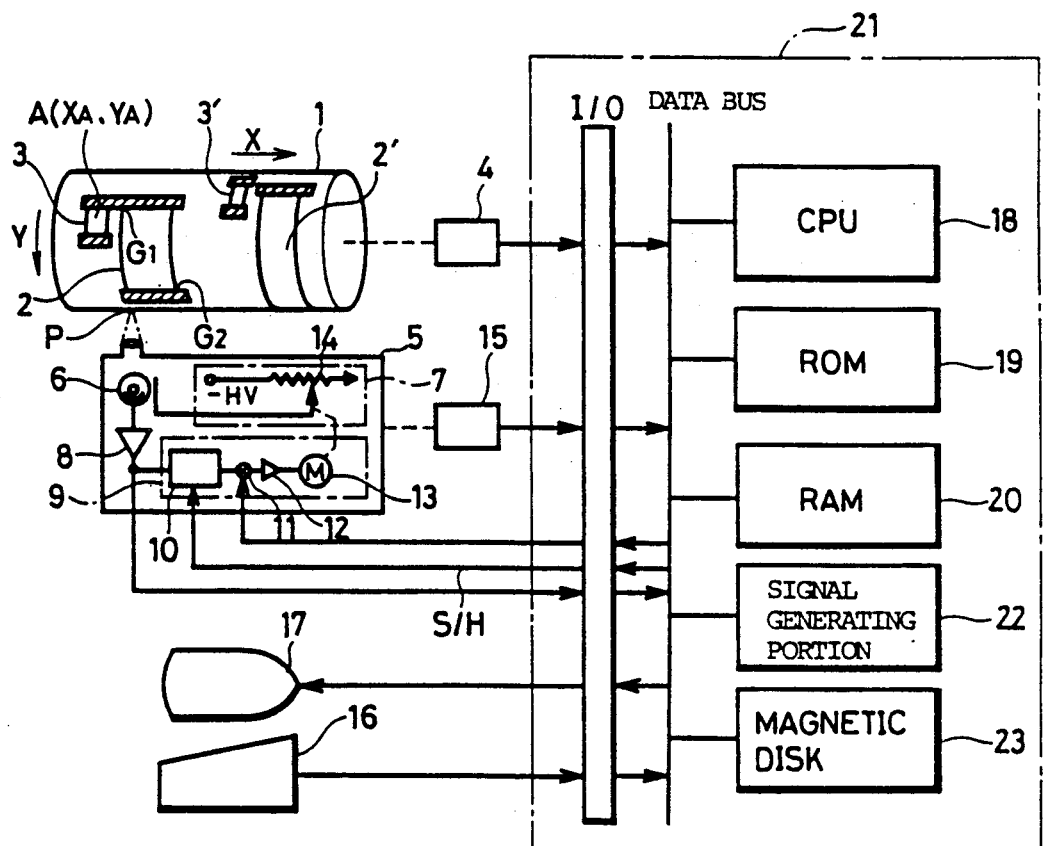
FIG. 2 is a block diagram showing an image reading apparatus to which the present invention is applied.

FIG. 2 is a block diagram showing an overview of one embodiment of the present invention. In the following description, the present invention is applied to a color scanner which has features in common with the color scanner of FIG. 1. The shared features are denoted by the same numerals and a further description thereof will not be provided.

The rotary drum 1 is rotated at a constant speed by a driving apparatus, not shown, and the angle of rotation is monitored by a rotary encoder 4. One or a plurality of originals 2 are applied directly onto the rotary drum 1 (or on a transparent flexible resin film wound on the drum). In FIG. 2, two originals 2 and 2' are shown applied on the drum 1. Reference portions 3 and 3' (which are large enough for calibration) are set at transparent portions near the originals 2 and 2' respectively. If a reflection original is to be read, a white region is set in the vicinity thereof. The front and rear portions of the reference portions 3 and 3' (in the main scanning direction Y) may be covered by light intercepting tapes (the hatched portions in the figure) to facilitate visual monitoring.

A linear scale 15 is provided on an axially movable scanning head 5. The linear scale 15 operates in association with the head 5. The position of the scanning head 5 in the axial direction (or subscanning direction) of the rotary drum 1 is detected by the linear scale 15. As shown in FIG. 1, the scanning head 5 comprises an apparatus for illuminating originals and photosensitive elements. The photosensitive elements comprise a spectral optical system for separating light received through the pickup lens into three primary colors, and a plurality of electric circuit systems for independently converting the separated light into electrical red (R), green (G), blue (B) and unsharp (U) signals. Only one electric circuit system is shown in FIG. 2.

Each of the electric circuit systems comprises a photomultiplier tube 6 which converts separated light into an electric signal, a driving portion 7 for driving the tube 6, an amplifier 8 for amplifying output signals from the photomultiplier tube 6, and a sensitivity setting portion 9 for adjusting and setting the sensitivity of the photomultiplier tube 6. The sensitivity setting portion 9 comprises a sample and hold circuit 10 for holding sample outputs from the amplifier 8 based on a signal from an arithmetic unit 21, a gate circuit 11 for transmitting the output of the sample and hold circuit 10 to an amplifier 12, and a motor 13 which is driven by the amplifier 12. The driving portion 7 comprises a variable resistor 14 with the slider thereof being driven by the motor 13. An internal high voltage (represented by $-HV$) is divided by the variable resistor 14 for application to the photomultiplier tube 6.

An operation table 16 and a display 17 for checking the operation of the apparatus and for an operator to instruct operations are connected to the arithmetic unit 21. The arithmetic operating unit 21 of the present apparatus comprises a ROM 19 for storing the operating program of the apparatus, a RAM 20 for temporary storage and a CPU 18.

Figure 3A:
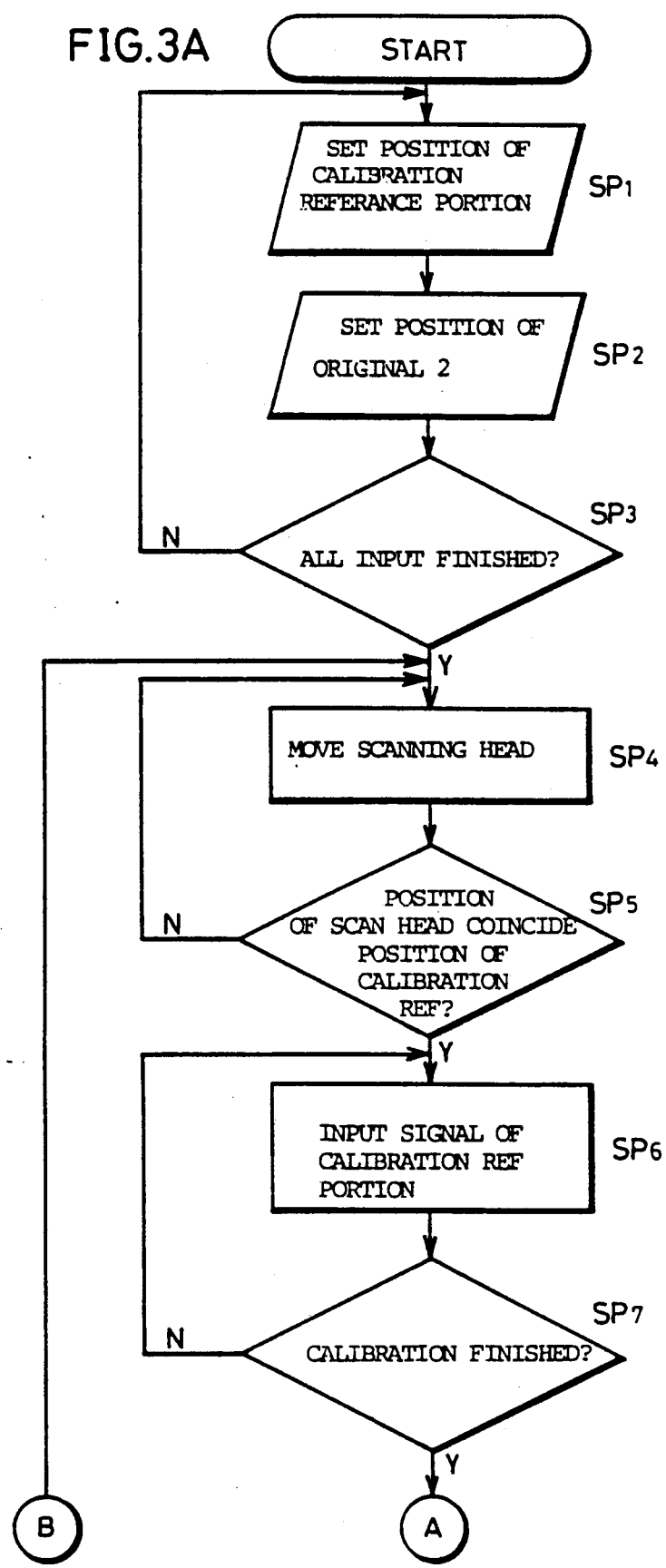
FIGS. 3A and 3B form a flow chart showing the operation of the image reading apparatus to which the present invention is applied.
Figure 3B:
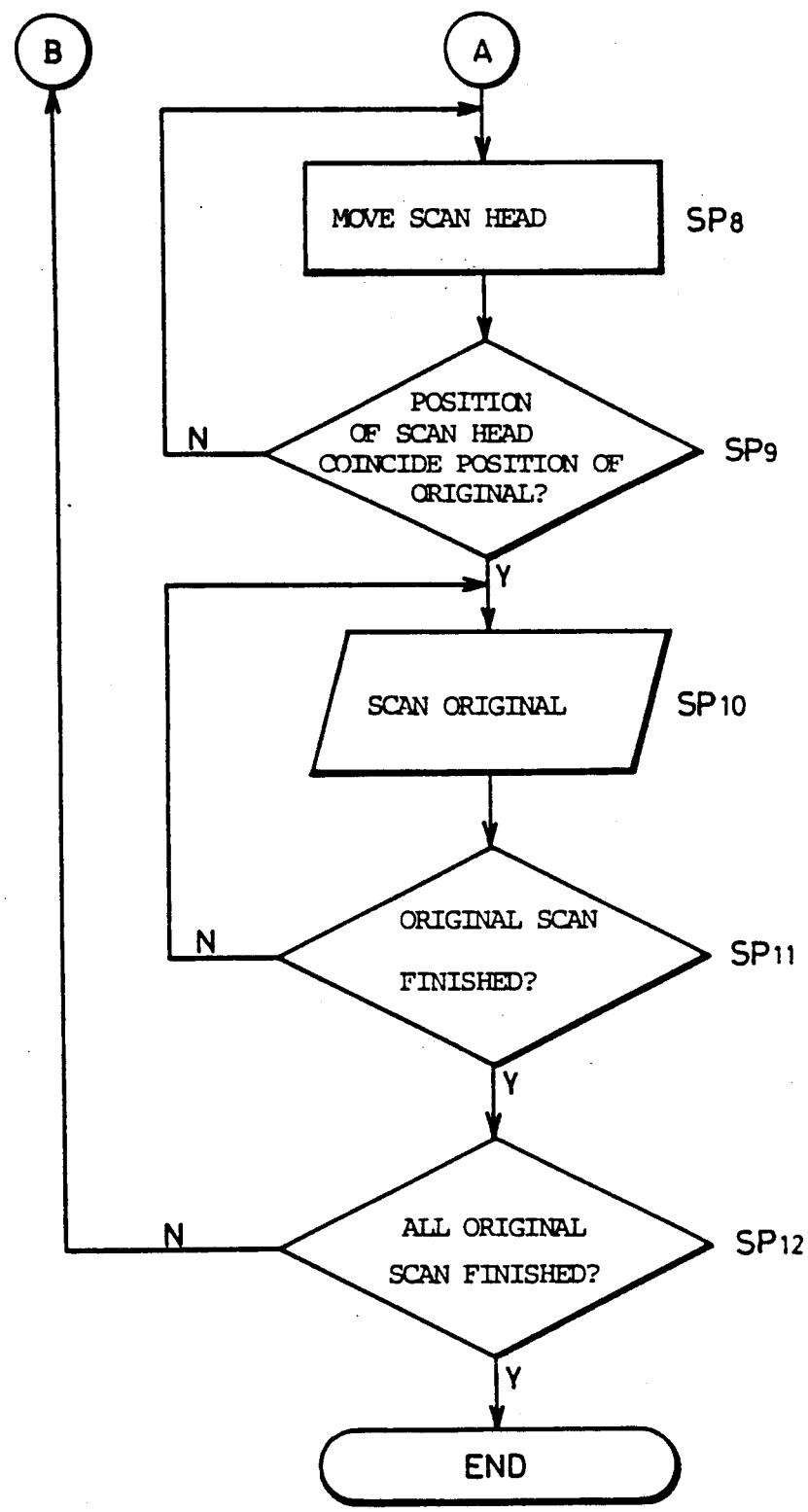

The operation of the embodiment will be described with reference to the flow chart of FIGS. 3A and 3B.

First, prior to reading an original, the output of the photomultiplier tube 6 is calibrated using the reference portion 3 in the following manner. The rotary drum 1 and the scanning head 5 are driven (or manually operated) such that the reading position P of the scanning head 5 coincides with the point A of the reference portion 3 for calibration. The instructions for this operation (SP1) are received from the operating portion 16. The CPU 18 counts outputs from the rotary encoder 4 and from the linear scale 15 and the counted values are stored in the RAM 20 as position information $(X_A, Y_A)$ corresponding to the Point A to the instruction (SP1). In a similar manner positional information $(X_{G1}, Y_{G1})$ and $(X_{G2}, Y_{G2})$ of two points $G_1$ and $G_2$ on the original 2 are stored in the memory (SP2). The respective positions of the reference portion 3' for calibration and of the corresponding original 2' are similarly stored in the RAM 20.

When all of the positional information of the originals and the corresponding reference portions has been inputted (SP3), the apparatus starts its operation (SP4). When the apparatus starts its operation, the rotary drum 1 rotates at a constant speed, and the scanning head 5 is driven in the X direction. At the same time, the position output of the linear scale 15 and the position $X_A$ in the X direction of the point A stored in the RAM 20 are compared to each other. When they coincide with each other (SP5), it is determined that the scanning head 5 has reached the position opposed to the position $X_A$ in the X direction of the point A, and calibration is carried out at this position (SP6). Movement of the scanning head 5 is stopped until the calibration is finished (SP7) but the rotary drum 1 continues to rotate.

Figure 4:
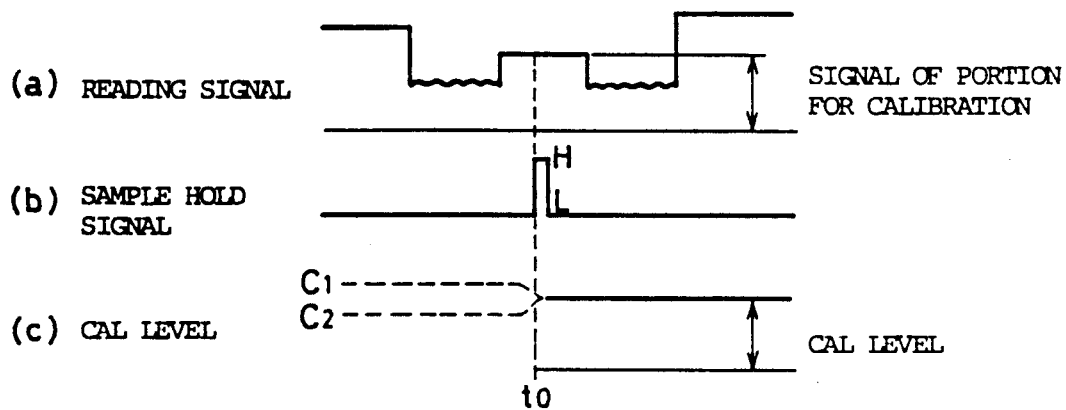
FIG. 4 is a diagram of waveforms of various signals before and after calibration.

FIG. 4 shows waveforms of signals before and after a point in time, $t_0$, (a) represents an output from the amplifier 8 (the reading signal) (b) denotes a sample hold signal (which, at $t_0$ is H) outputted from a signal generating portion 22 in response to an instruction from the CPU 18 based on data in the RAM 20. The signal is transmitted to the sample hold circuit 10 by the line S/H illustrated in FIG. 2. (c) shows the waveform of the output from the amplifier 8 being held as a sample by the sample hold circuit 10. The signal level which is held as a sample prior to $t_0$ is held from a previous operation of the hold circuit 10 and is normally different from the calibration or CAL level at $t_0$. That is, calibration levels $C_1$ and $C_2$ were derived from respective previously considered reference positions as described above. The calibration instruction signal outputted from the CPU 18 is transmitted to the gate circuit 11.

In this manner, the sample hold circuit 10 samples the signal level generated by scanning the reference portion 3 (outputted from the photomultiplier tube 6) when the sample hold signal is "H", and it holds the light intensity value when the signal becomes "L" as shown in FIG. 4(c). When the output signal of the sample hold circuit 10 is applied to the motor 13 through the gate circuit 11, the slider of the variable resistor 14 is driven to adjust the sensitivity of the photomultiplier tube 6 thereby calibrating output of the tube 6 (and the amplifier 8). Thus, the output level of the photomultiplier tube 6 becomes an appropriate value when the reference portion 3 for is detected. By appropriate value is meant a value which enables proper conversion of the photosensitive portions enables and enables setting of the sensitivity of the photosensitive portions. Proper conversion puts light intensity and the corresponding output electric signals in proper proportion to each other. The appropriate value usually has a margin, and is appropriately set within a range.

When the photosensitive portions have been calibrated (SP7), the sensitivity setting portion 9 remains as it is and the scanning head 5 is again driven in the direction of the X axis (SP8). When the scanning head reaches the position of the original 2 (SP10), the original 2 is scanned and read with the apparatus properly calibrated.

When the original 2 has been read (SP11), the next original 2' is read. In the same manner as described above, calibration of the photosensitive portion is carried out using the reference portion 3'. Reading is then successively carried out. These operations are continuously carried out for respective originals while the rotary drum 1 is rotated (SP12).

The foregoing description concerned an image scanning reading apparatus employing a rotary drum. The present invention may also be applied to a scanning reading apparatus of the planar type which has been popular recently. In the planar type apparatus, originals are applied on a original holder comprising a transparent glass upper frame and a lower plate. Reference portions are applied in the vicinity of respective originals.

In the above described embodiment, the calibration is carried out by adjusting the sensitivity of the photomultiplier tube. A solid state image sensing device such as a CCD may also be employed as the photosensitive portion. Calibration of such a device may be carried out by electrical processing such as control of the rate of amplification of the circuit amplifying the output signal of the CCD, instead of the motor control of the above described embodiment.

In the above described embodiment, position information in the subscanning direction is obtained by a linear scale provided in association with the scanning head 5. If the drum is driven by a precise screw, position information in the subscanning direction may be obtained by adding the detected number of rotations of the rotary drum 1.

Although the position information of the reference portions and of the originals is inputted with the scanning head in an aligned position in the above-described, embodiment, the information may be set by the table when the respective positions are set and known in advance.

In addition, if the reference position has a predetermined area and the portion is defined by two points in the X direction as in the case of the original, the scanning head need not be stopped during calibration: That is, calibration can be carried out between the two points.

In the above described embodiment, the present invention is applied to an apparatus for reading a color original. The present invention may also be applied to an apparatus for reading monochrome originals. In such a case, calibration is carried out such that the photosensitive portion has proper photoelectric converting characteristics, in association with the foregoing description.

The image scanning reading apparatus in accordance with the present invention may be applied to an apparatus which is directly connected to a recording apparatus so that reading and recording occur simultaneously. The invention also applies to an apparatus in which image signals are temporarily stored in a medium such as a magnetic disc 23.

According to the present invention, calibration of photosensitive portions can be carried out while the means for holding the originals is driven or rotated. Compared with the prior art, in which calibration is carried out only when the original holder is stopped, the present invention facilitates automatic operation of the apparatus. Therefore, the efficiency of the apparatus is improved.

Furthermore, since calibration of the photosensitive portions is carried out while the original holder is driven, the calibration the color separation of the original are carried out under the same conditions.

Therefore, compared with calibration carried out while the original holder is stopped a more practical calibration of the electric circuits can be carried out. Thus, more precise color separation can be carried out.

Although a preferred embodiment has been described and illustrated in detail, it is clearly understood that the same is by way of illustration and example only and is not to be taken by way of limitation. The scope of the present invention should be limited only by the terms of the appended claims.

What is claimed is:

1. A method of efficiently and precisely reading a plurality of originals, comprising the steps of:
   (a) locating at least a first reference portion, a first original, a second reference portion and a second original on a holder, said first reference portion, said first original, said second reference portion and said second original being successively arranged in a sub-scanning direction, said first reference portion being immediately adjacent to said first original, and second reference portion being immediately adjacent to said second original;
(b) subsequently, moving said scanning means in said sub-scanning direction until said scanning means is in position to receive light from said first reference portion, and then calibrating said scanning means as a function of light received by said scanning means from said first reference portion;
(c) subsequently, moving said scanning means in said sub-scanning direction and using said scanning means to optically read said first original;
(d) subsequently, moving said scanning means in said sub-scanning direction until said scanning means is in position to receive light from said second reference portion, and then calibrating said scanning means as a function of light received by said scanning means from said second reference portion; and
(e) subsequently moving a scanning means in said sub-scanning direction and using said scanning means to optically read said second original;
wherein said holder is moved continuously in said main scanning direction during and between steps (b) through (e).

2. The method of claim 1, further comprising the steps of:
prior to step (b), obtaining first reference data corresponding to the position of said holder in said main scanning direction and the position of said scanning means in said sub-scanning direction when said scanning means is in position to receive light from said first reference portion;
prior to step (b), obtaining second reference data corresponding to the position of said holder in said main scanning direction and the position of said scanning means in said sub-scanning direction when said scanning means is in position to receive light from said second reference portion; and
during steps (b) through (e), obtaining position data corresponding to the position of said holder in said main scanning direction and the position of said scanning means in said sub-scanning direction;
wherein the step of calibrating said scanning means as a function of light received by said scanning means from said first reference portion is in response to coincidence between said position data and said first reference data;
wherein the step of calibrating said scanning means as a function of light received by said scanning means from said second reference portion is in response to coincidence between said position data and said second reference data.

3. The method of claim 2, further comprising the step of modifying said scanning means so to change the dimensions of pixels which are read by said scanning means, the step of modifying said scanning means occurring after step (c) and before step (d).

4. The method of claim 3, wherein said originals are transparent.

5. The method of claim 3, wherein said originals do not transmit light.

6. The method of claim 3, wherein the step of modifying said scanning means includes exchanging apertures associated with said scanning means.

7. The method of claim 3, wherein said first original is physically separated from said first reference portion.

8. The method of claim 7, wherein said reference portions are physically separated from each other.

9. An apparatus for efficiently and precisely reading a plurality of originals, the apparatus comprising:
a holder for holding a first reference portion, a first original, a second reference portion and a second original;
scanning means for scanning said holder and for successively optically reading said first reference portion, said first original, said second reference portion and said second original, said scanning means including a photosensitive portion for receiving light from said reference portions and said originals;
a memory for storing first and second reference data, said first reference data corresponding to the position of said scanning means with respect to said holder when said scanning means is in position to receive light from said first reference portion, said second reference data corresponding to the position of said scanning means with respect to said holder when said scanning means is in position to receive light from said second reference portion;
detecting means for detecting the position of said scanning means with respect to said holder and for generating position data corresponding to the position of said scanning means with respect to said holder; and
calibrating means for adjusting the sensitivity of said photosensitive portion when there is a coincidence between said position data and said first reference data and when there is a coincidence between said position data and said second reference data, the sensitivity of said photosensitive portion being adjusted as a function of light received by said scanning means from said first and second reference portions during said coincidence between said position data and said first and second reference data, respectively.

10. An apparatus according to claim 9, wherein said calibrating means is housed in the same housing as said scanning means.

11. An apparatus according to claim 9, wherein said holding means is cylindrical and rotatable.

12. An apparatus according to claim 9, wherein said detecting means includes a linear encoder.

13. The apparatus of claim 9, wherein said scanning means includes a plurality of photosensitive portions.

14. An apparatus according to claim 9, wherein said photosensitive portion includes a photomultiplier tube.

15. An apparatus according to claim 14, wherein said photosensitive portion includes means for generating an output voltage corresponding to light received by said scanning means and said calibrating means includes means for adjusting said output voltage generating means.

* * * * *